2 Sheets—Sheet 1.
G. STOUDINGER.
Rolling Plates, Bars, &c.
6332 x.
Patented Jan. 11, 1831.
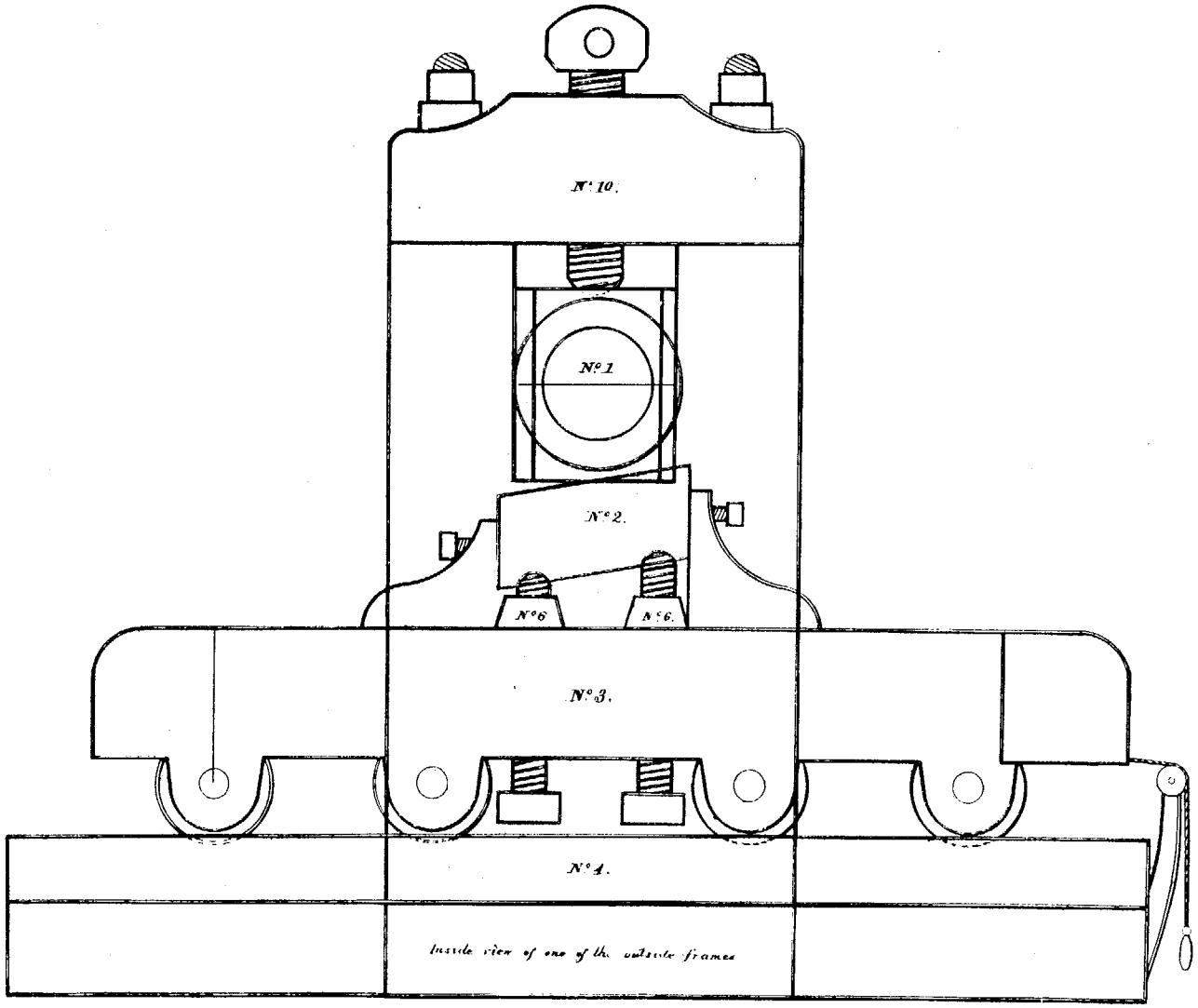

80. METAL ROLLING.
Platen & Roll.
19.
2 Sheets—Sheet 2.
G. STOUDINGER.
Rolling Plates, Bars, &c.
Patented Jan. 11, 1831.
6332 x.
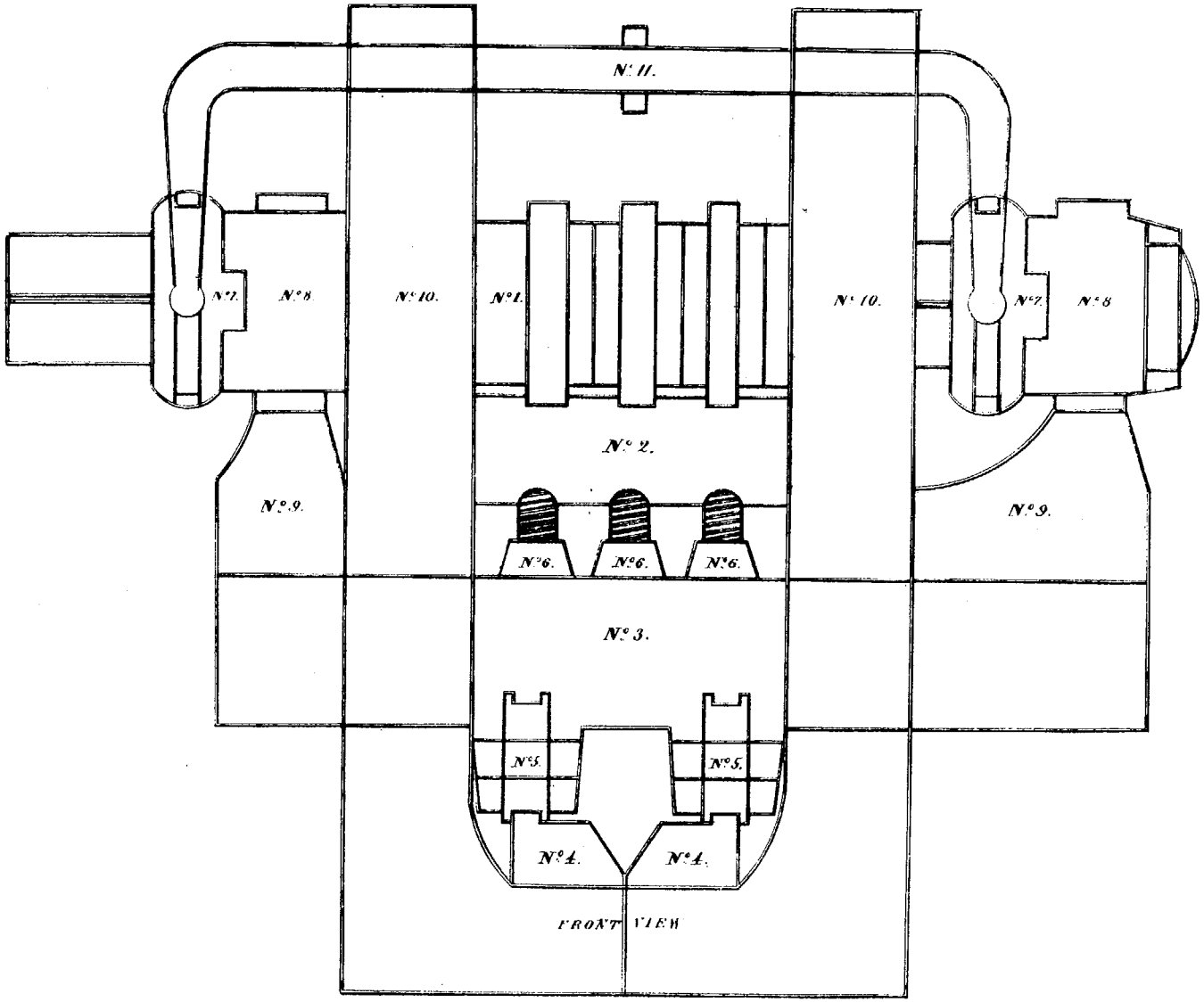

George Stoudinger. Newark N.J.

Letters Patent.

The Schedule referred to in these Letters Patent and making part of the same, containing a description, in the words of the said George Stoudinger, himself of his improvement in the Machine for edging and drawing Steel points for carriage Springs.

To all to whom these presents shall come.

Be it known that I, George Stoudinger, of Newark in the County of Essex, and State of New Jersey, have invented a new and useful Machine for edging and drawing steel points for carriage springs, and that the following is a full and exact description of the construction and operation of the said Machine as invented by me.

N° 1. Is a horizontal roller with three projections on, and three grooves in, and on each end is a coupling, and also one big wheel which the couplings so fit as to put it in and out of Gear.

N° 2. Is a female die with grooves in, to correspond with the projections, and grooves on the horizontal roller; said grooves are to draw points from one inch up to three inches in width and from one eighth of an inch up to three quarters of an inch thick.

N° 3. Is a carriage in which the female die is placed, said die is raised to any taper by six screws, which go through the plate of the carriage, and also two racks, which fit on the carriage on the outside of the frames, which are driven from the big wheels on the ends of the horizontal Roller; The carriage when in gear forces the the point of the plate through, and by putting it out of gear it runs back by weights or a spring attached to the back part of the carriage. said carriage has eight wheels under it with grooves in them, to correspond with the track on which they run.

N°. 4. are two bearings on which Number three runs.

N°. 5. are wheels which fit on under Number three.

N°. 6. are screws which raise the female die to any Taper.

N°. 7. are couplings which fit in cog wheels, number eight.

N°. 8. are cog wheels which fit in racks to force the carriage forward

N°. 9. are racks which fit on the outside of the carriage.

N°. 10. Are frames in which the horizontal roller works.

N°. 11. Is a Lever - to put the couplings in and out of gear; said points are drawn by pulling the plate between the horizontal rollers; and the female die. In the first place edge the point down a little, and then put it in the grooves of the female die, and put machine in gear which moves the carriage along, and forces the plate to a point.

The drawings on a scale of one quarter to the inch, accompany this specification, and are hereby referred to. Said machine is all cast iron, except the screws.

To which Specification I have hereunto Subscribed my name, in the presence of two Witnesses, the twentieth day of December in the year of our Lord, One thousand eight hundred and thirty.

Witnesses
Wm Pennington
Wm Worts

George Stoudinger

572 [illegible]